US006286066B1

(12) United States Patent
Hayes et al.

(10) Patent No.: US 6,286,066 B1
(45) Date of Patent: Sep. 4, 2001

(54) HOT-PLUG INTERFACE FOR DETECTING ADAPTER CARD INSERTION AND REMOVAL

(75) Inventors: Stuart Hayes; Mukund P. Khatri, both of Austin, TX (US)

(73) Assignee: Dell U.S.A., L.P., Round Rock, TX (US)

( * ) Notice: Subject to any disclaimer, the term of this patent is extended or adjusted under 35 U.S.C. 154(b) by 0 days.

(21) Appl. No.: 09/211,321

(22) Filed: Dec. 15, 1998

(51) Int. Cl.[7] .................................................. G06F 13/00
(52) U.S. Cl. .......................... 710/103; 710/102; 235/492
(58) Field of Search ................................... 710/101–103, 710/8, 2, 10, 15, 16, 18; 235/492, 472.01, 441, 487

(56) References Cited

U.S. PATENT DOCUMENTS

| | | |
|---|---|---|
| 4,365,317 | 12/1982 | Gheewala . |
| 4,494,329 | 1/1985 | Post et al. . |
| 4,787,060 | 11/1988 | Boudreau et al. . |
| 5,062,806 | 11/1991 | Ohno et al. . |
| 5,241,643 | 8/1993 | Durkin et al. . |
| 5,601,349 | 2/1997 | Holt . |
| 5,742,013 | 4/1998 | Myojin et al. . |
| 5,881,251 * | 3/1999 | Fung et al. ............................ 710/103 |
| 5,996,035 * | 11/1999 | Allen et al. ............................ 710/103 |
| 6,026,458 * | 2/2000 | Rasums ................................ 710/103 |
| 6,032,209 * | 2/2000 | Mros et al. ............................ 710/103 |
| 6,038,615 * | 3/2000 | Yamada et al. .......................... 710/2 |
| 6,044,424 * | 3/2000 | Amin .................................. 710/103 |
| 6,062,480 * | 5/2000 | Evoy .................................... 235/492 |

OTHER PUBLICATIONS

"PCI Bus Hot Plug Specification", Revision 1.0, Jun. 15, 1997, pp. i–vi, and 1–29.

* cited by examiner

Primary Examiner—Robert Beausoleil
Assistant Examiner—Raymond N Phan
(74) Attorney, Agent, or Firm—Skjerven Morrill MacPherson LLP; Ken J. Koestner

(57) ABSTRACT

Adapter cards generally have a metal bracket at one end. The adapter card attaches to an adapter card slot of a computer system by fastening the bracket to a connector on the computer system. Conventionally, the bracket is fastened to the connector using a screw. It has been discovered that an electrically-conductive flip-down retainer advantageously functions as an improved fastener to secure the adapter card to the connector. The electrically-conductive flip-down retainer is a single structure that performs the combined functions of an electrical switch and a mechanical fastener. The electrically-conductive flip-down retainer includes electrical contacts that form a closed circuit when the bracket is fastened to the connector and an open circuit when the bracket is not fastened. The electrical contacts are connected to conductors extending to a controller. The controller monitors the status of the electrical switch of the electrically-conductive flip-down retainer and controls application of power to the adapter card slot, typically under control of an operating system. The controller terminates power to the adapter card slot when the electrically-conductive flip-down retainer is unfastened, indicating that the adapter card is disengaged from the adapter card slot. The controller restores power to the adapter card slot when the electrically-conductive flip-down retainer is fastened, indicating the adapter card is engaged with the adapter card slot.

26 Claims, 7 Drawing Sheets

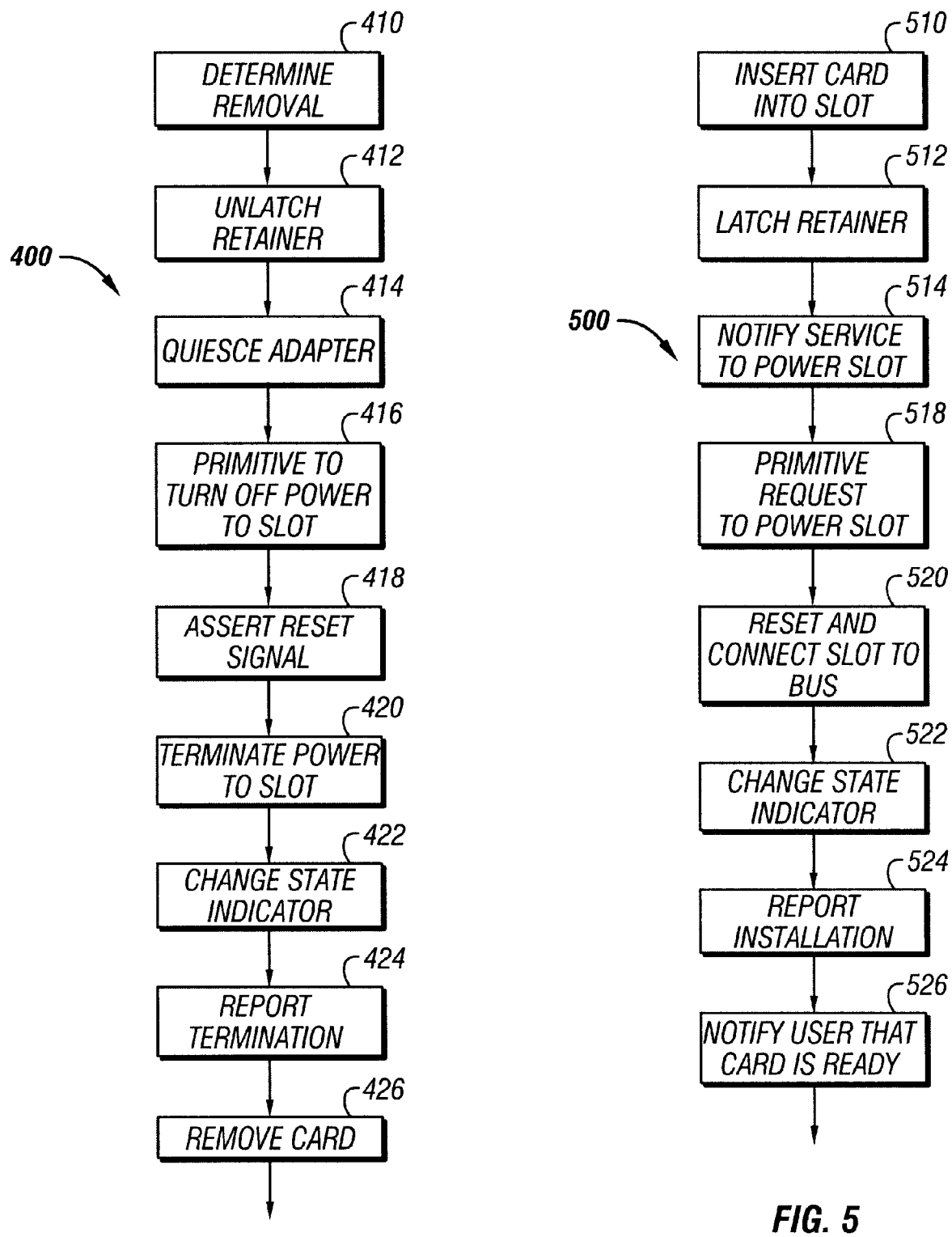

HOT-PLUG INTERFACE FOR DETECTING ADAPTER CARD INSERTION AND REMOVAL

BACKGROUND OF THE INVENTION

1. Field of the Invention

The present invention relates to computers. More specifically, the invention relates to a switch device in a computer and an associated method of operation for notifying an hot-plug interface of insertion and removal of an adapter card.

2. Description of the Related Art

Computer systems communicate with various peripheral devices and other computer systems via communication buses. The peripheral devices are generally connected to the communication buses by an adapter card. Communication buses are generally fault-intolerant so that a failure of an adapter card may have a wide range of effects on system performance. In some cases, adapter card failure may prevent subsequent bus transactions. Some failures may corrupt main memory. Sometimes failure may result in the loss of only a single, localized network connection. Often, the effects are unpredictable.

A common cause of system failure is the accidental accessing, by removing or installing, adapter cards from a card slot connected to a communication bus while the card slot is powered and running. Although system manufacturers, systems administrators, and others warn of the dire consequences of adapter card manipulation while the card slot is powered, occasionally a card is accidentally removed or added while the slot is powered, typically resulting in failure of the server and loss of productive work by staff.

To prevent system failure due to card removal or addition while a slot is powered, a "Hot-Plug" specification has been adopted which sets forth devices and structures to allow insertion and removal of adapter cards from a powered communication bus. One such specification is a PCI (Peripheral Communication Interface) Hot-Plug specification which sets standards for aspects of removal and insertion of PCI adapter cards while the system is running. The Hot-Plug specification is applicable to desktop computers, portable systems, target server platforms, and the like.

Operating systems that are widely used in the computing industry are not generally designed to tolerate unexpected removal of devices. The Hot-Plug specification has thus been created to define a sequence of user actions and system management facilities that inform the operating system of a desire to remove an adapter card. The actual removal is not to occur until the software system acknowledges readiness.

In addition, adapter cards are not generally designed to be connected to a slot that is already powered. Accordingly, the Hot-Plug specification defines a sequence of user actions and system behavior to ensure the removal of power to a slot before a card is inserted into the slot.

The insertion or removal of an adapter card without following the proper sequence may cause unpredictable results, including data corruption, abnormal termination of the operating system, damage to the adapter card, or damage to platform hardware.

What is needed is an interface device and associated operating method that simply, conveniently, and inexpensively ensure that power is removed from a slot during removal and insertion of an adapter card.

SUMMARY OF THE INVENTION

Adapter cards generally have a metal bracket at one end. The adapter card attaches to an adapter card slot of a computer system by fastening the bracket to a connector on the computer system. Conventionally, the bracket is fastened to the connector using a screw. It has been discovered that an electrically-conductive flip-down retainer advantageously functions as an improved fastener to secure the adapter card to the connector. The electrically-conductive flip-down retainer is a single structure that performs the combined functions of an electrical switch and a mechanical fastener. The electrically-conductive flip-down retainer includes electrical contacts that form a closed circuit when the bracket is fastened to the connector and an open circuit when the bracket is not fastened. The electrical contacts are connected to conductors extending to a controller. The controller monitors the status of the electrical switch of the electrically-conductive flip-down retainer and controls application of power to the adapter card slot, typically under control of an operating system. The controller terminates power to the adapter card slot when the electrically-conductive flip-down retainer is unfastened, indicating that the adapter card is disengaged from the adapter card slot. The controller restores power to the adapter card slot when the electrically-conductive flip-down retainer is fastened, indicating the adapter card is engaged with the adapter card slot.

The dual-functionality of the electrically-conductive flip-down retainer advantageously eliminates the need for a separate button or interactive user input to notify the operating system whether operating power is to be terminated or restored to an adapter card slot, and for which adapter card slot power is to be modified. The dual-functionality electrically-conductive flip-down retainer advantageously eliminates the risk of removal or insertion of the adapter card to an adapter card slot that has applied power.

BRIEF DESCRIPTION OF THE DRAWINGS

The features of the described embodiments are specifically set forth in the appended claims. However, embodiments of the invention relating to both structure and method of operation, may best be understood by referring to the following description and accompanying drawings.

FIG. 4 is a schematic flow chart showing a general sequence of operations for removing an adapter card from an adapter card slot that is currently powered in a hot-plug system using the described electrically-conductive flip-down retainer.

FIG. 5 is a schematic flow chart illustrating a general sequence of operations for terminating power to an adapter card slot and isolating the bus prior to insertion of an adapter card.

DESCRIPTION OF THE EMBODIMENT(S)

Figure 1:
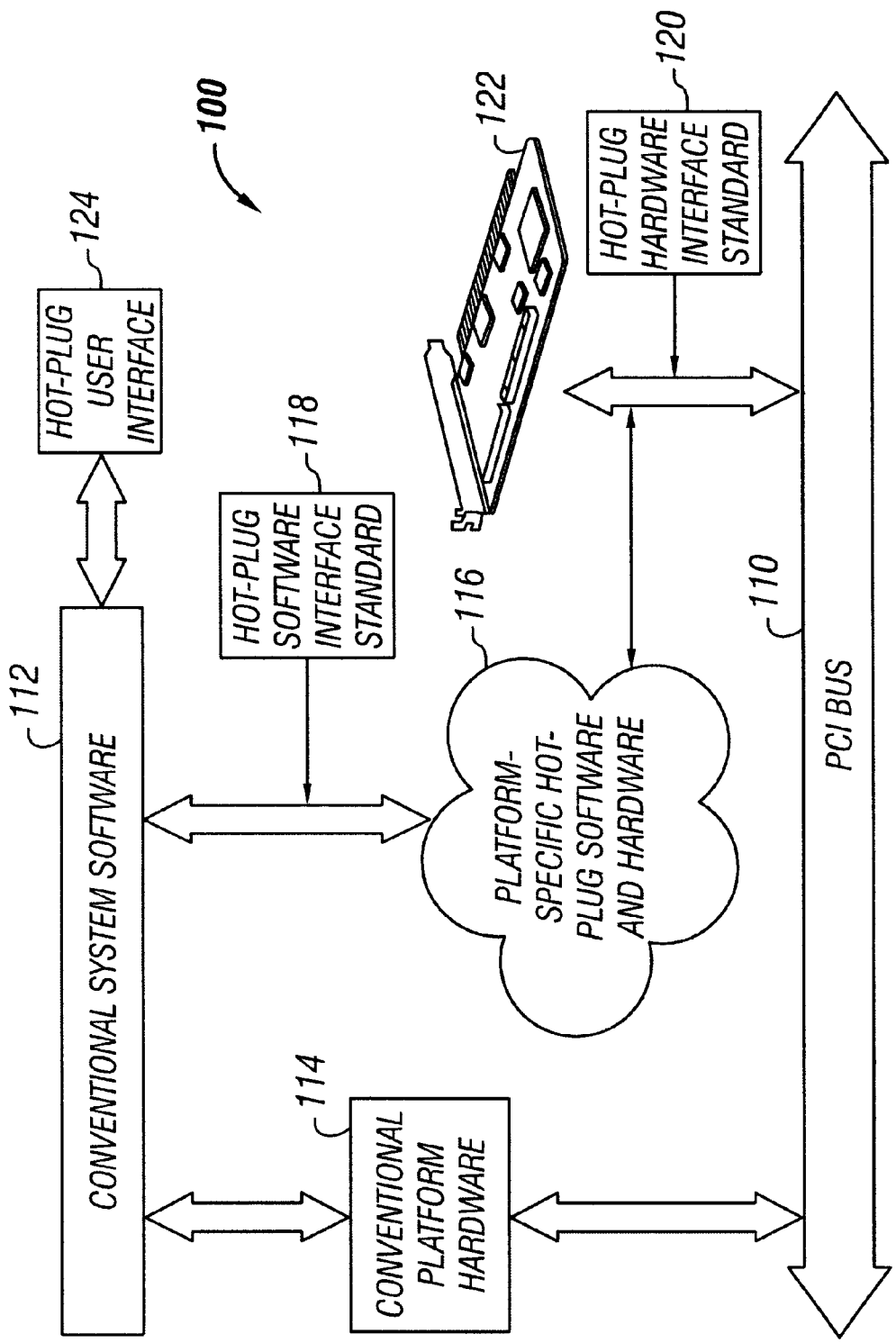
FIG. 1 is a schematic block diagram illustrating hardware and software components of a computer system that includes a hot-plug interface.

Referring to FIG. 1, a schematic block diagram illustrates hardware and software components of a computer system 100 that includes a hot-plug interface. In an illustrative example, a peripheral component interconnect (PCI) bus specification defines communication structures and protocols of a PCI bus 110 that are commonly used to interconnect processors and peripheral devices in computer systems. The PCI specification defines extended functionality that allows "hot-plugging" of PCI adapter cards. Hot-plugging is defined as insertion and removal of adapter cards while power is applied to a computer system and the computer system is running. One problem addressed by the PCI bus specification is that PCI adapter cards are not conventionally designed to allow hot-plugging. Furthermore, the PCI bus specification presumes that adapter cards not be required to allow hot-plugging in the future, thus assigning the responsibility for hot-plugging on the system and not the adapter cards. Accordingly one of the requirements of the PCI specification relating to hot-plugging is that the adapter card slot be isolated from the PCI bus and powered down prior to removal or insertion of an adapter card. Thus the adapter card is not to be inserted or removed from a live PCI bus.

The hot-plug computer system 100 has several software components including conventional system software 112, representing applications, system management functions, operating systems, and peripheral device drivers for controlling peripheral devices. The peripheral devices include PCI adapter cards which are supported by conventional systems that do not include a hot-plug functionality. The hot-plug computer system 100 includes conventional platform hardware 114 representing processors, central processing units (CPUs), and peripheral devices. A hot-plug user interface 124 supports interactions between a user and the conventional system software 112.

The hot-plug computer system 100 also includes platform-specific hot-plug software and hardware 116 that controls power and bus connections on PCI bus slots that accept PCI standard adapter cards. The PCI specification sets a hot-plug software interface standard 118 between the conventional system software 112 and the platform-specific hot-plug software and hardware 116 that specifies the information content of requests and responses crossing the interface, although the information format may vary among operating systems. The PCI specification also sets a hot-plug hardware interface standard 120 between the platform-specific hot-plug software and hardware 116 and PCI adapter cards 122. Generally, the hot-plug hardware interface standard 120 conforms to the standard PCI Local Bus Specification.

The PCI Hot-Plug specification has several difficulties. For example, a convenient and efficient technique for informing an operating system which slot to power down is needed. The PCI Hot-Plug specification current recommends that system designers mount a switch or button by each slot. A user depresses the button or actuates the switch to request the operating system to terminate power to the slot. Alternatively, a user informs the operating system through an interactive software-based technique, such as via a dialog box, of the slot to power down. After an adapter card is inserted, the operating system is similarly notified through usage of the button or software interface to return power to the slot.

Another difficulty is that the usage of some technique to inform the operating system to power down a slot does not prevent a user from simply inserting or removing an adapter card from the slot while power is applied to the slot. The PCI Hot-Plug specification sets forth that indicator lights are to be used to inform the user when power is applied or not applied to a slot, but does not prevent a user from ignoring the indicator lights. A possibility of error remains. Consequences of error include termination of system operations and hardware damage.

Figure 2:
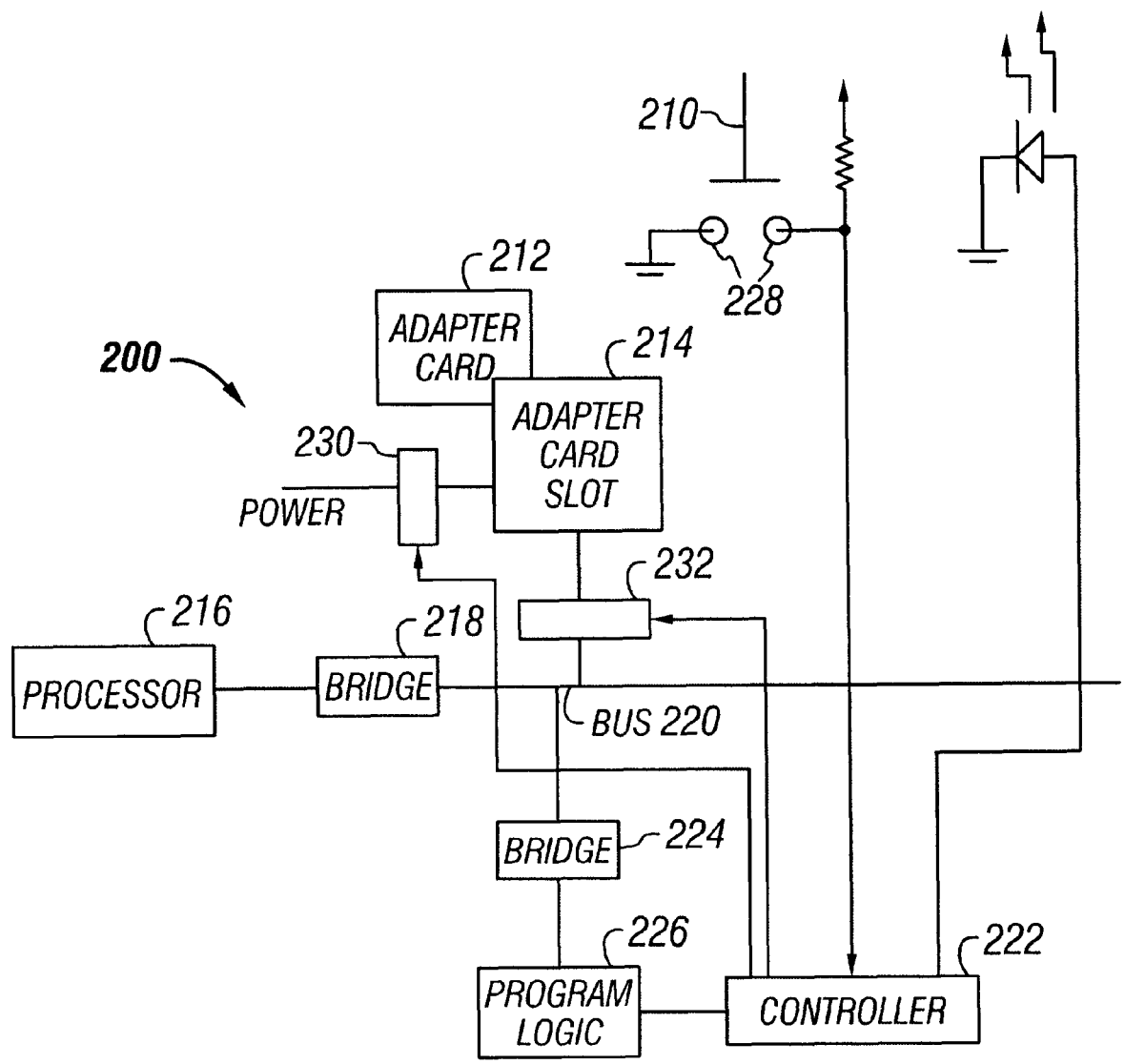
FIG. 2 is a schematic block diagram that illustrates a computer system including an electrically-conductive flip-down retainer to secure an adapter card to an adapter card slot.

Referring to FIG. 2, a schematic block diagram illustrates a computer system 200 that includes an electrically-conductive flip-down retainer 210 to secure an adapter card 212 to an adapter card slot 214. The computer system 200 includes a processor 216 connected by a bridge 218 to an interface bus 220. In the illustrative embodiment, the interface bus 220 is a peripheral component interconnect (PCI) bus. The computer system 200 also includes a controller 222 that monitors and controls hot-plug functionality.

In an illustrative embodiment, the controller 222 is termed a "Hot-Plug" microcontroller to designate that the controller is used to perform hot-plug sensing and control. The controller 222 may be implemented as any suitable type of controller including microcontrollers, processors, programmable logic arrays, discrete logic, and the like. The controller 222 is connected to the interface bus 220 via a bridge 224. The bridge 224 is further connected to a program logic block 226 via an "X-bus", which is a subset of an ISA bus. The program logic block 226 is connected to the controller 222. The interconnections of the controller 222 with the system are exemplary only. Other suitable controller 222 interconnections may be employed.

The controller 222 has monitoring connections to the electrically-conductive flip-down retainer 210 at electrical contacts 228. The controller 222 is connected to the electrically-conductive flip-down retainer 210 to sense and monitor engagement and disengagement of the adapter card 212 with the adapter card slot 214. The controller 222 also includes control connections to the adapter card slot 214 including a connection to a switch 230, such as a field-effect transistor (FET) switch, that controls application of power to the adapter card slot 214. The computer system 200 also has a control connection to an indicator 232, such as a light-emitting diode (LED), that indicates whether power is applied to the adapter card slot 214.

Only a single adapter card slot 214 and electrically-conductive flip-own retainer 210 are shown for illustrative purposes only, a system will typically include a plurality of adapter card slots and electrically-conductive flip-down retainers, although single-slot systems may be employed in some systems.

Figure 8:
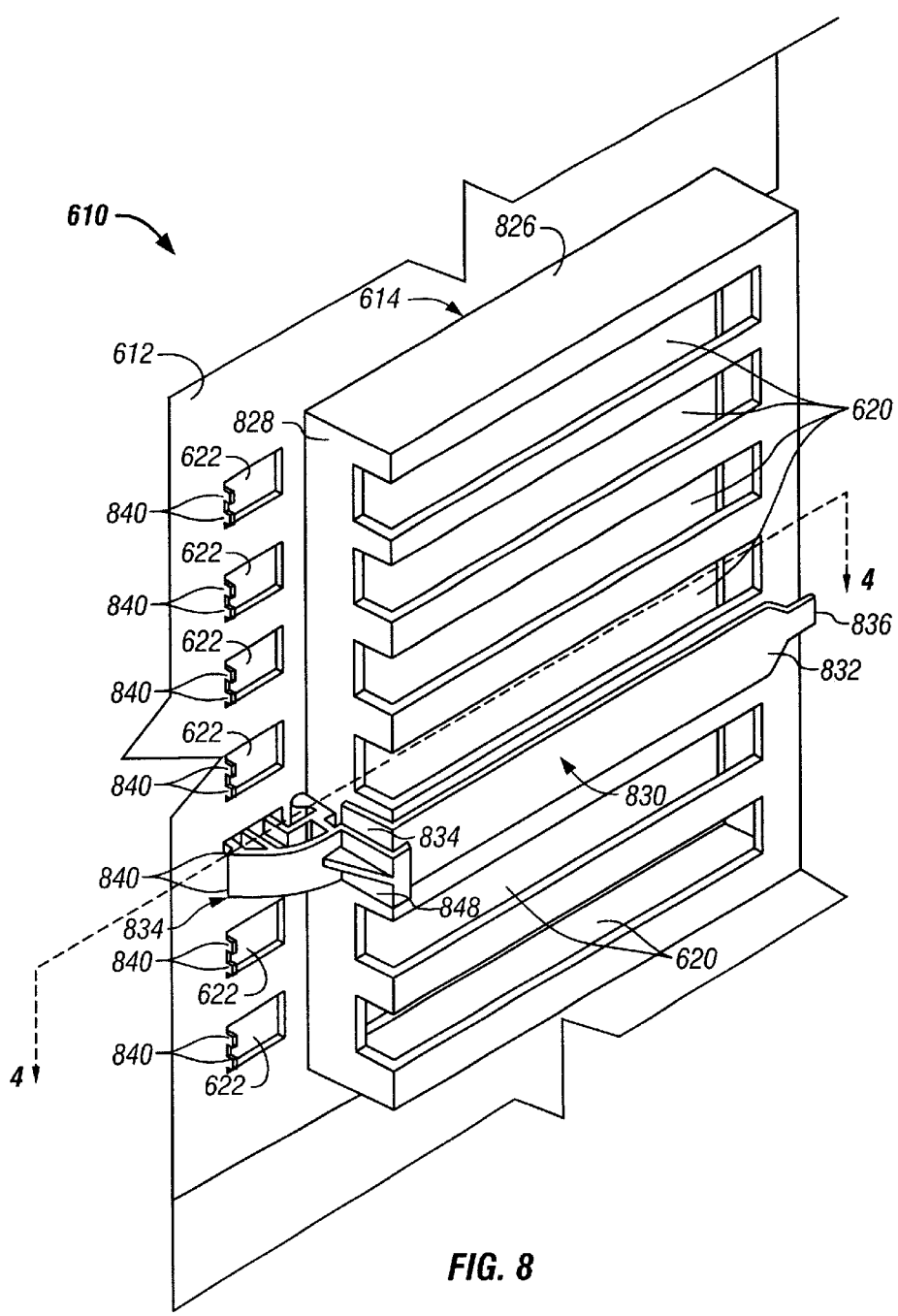
FIG. 8 is a perspective isometric view showing the card cage with retainer apertures in the chassis wall and a retainer in an engaged position against a card guide.

The electrically-conductive flip-down retainer 210 performs a monitoring function in addition to functionality as a fastener to secure the adapter card 212 to an adapter card slot 214, also called a connector. The electrically-conductive flip-down retainer 210 is a single structure that performs the combined functions of an electrical switch and a mechanical fastener. The electrically-conductive flip-down retainer 210 includes electrical contacts 228 that are coupled to monitoring terminals (not shown) to form a closed circuit when a bracket or, equivalently card guide 830 shown in FIG. 8, is fastened to the connector and an open circuit when the bracket is not fastened. The electrical contacts 228 are connected via the monitoring terminals to conductors extending to the controller 222. The controller 222 monitors the status of the electrical switch of the electrically-conductive flip-down retainer 210 and controls application of power to the adapter card slot 214, typically under control of an operating system.

The controller 222 terminates power to the adapter card slot 214 when the electrically-conductive flip-down retainer 210 is unfastened, indicating that the adapter card 212 is disengaged from the adapter card slot 214. The controller 222 restores power to the adapter card slot 214 when the electrically-conductive flip-down retainer 210 is fastened, indicating the adapter card 212 is engaged with the adapter card slot 214.

The dual-functionality of the electrically-conductive flip-down retainer 210 advantageously eliminates the need for a separate button or interactive user input to notify the operating system whether operating power is to be terminated or restored to the adapter card slot 214, and for which adapter card slot power is to be modified. The dual-functionality electrically-conductive flip-down retainer 210 advantageously eliminates the risk of removal or insertion of the adapter card 212 to an adapter card slot 214 that has applied power.

Figure 3:
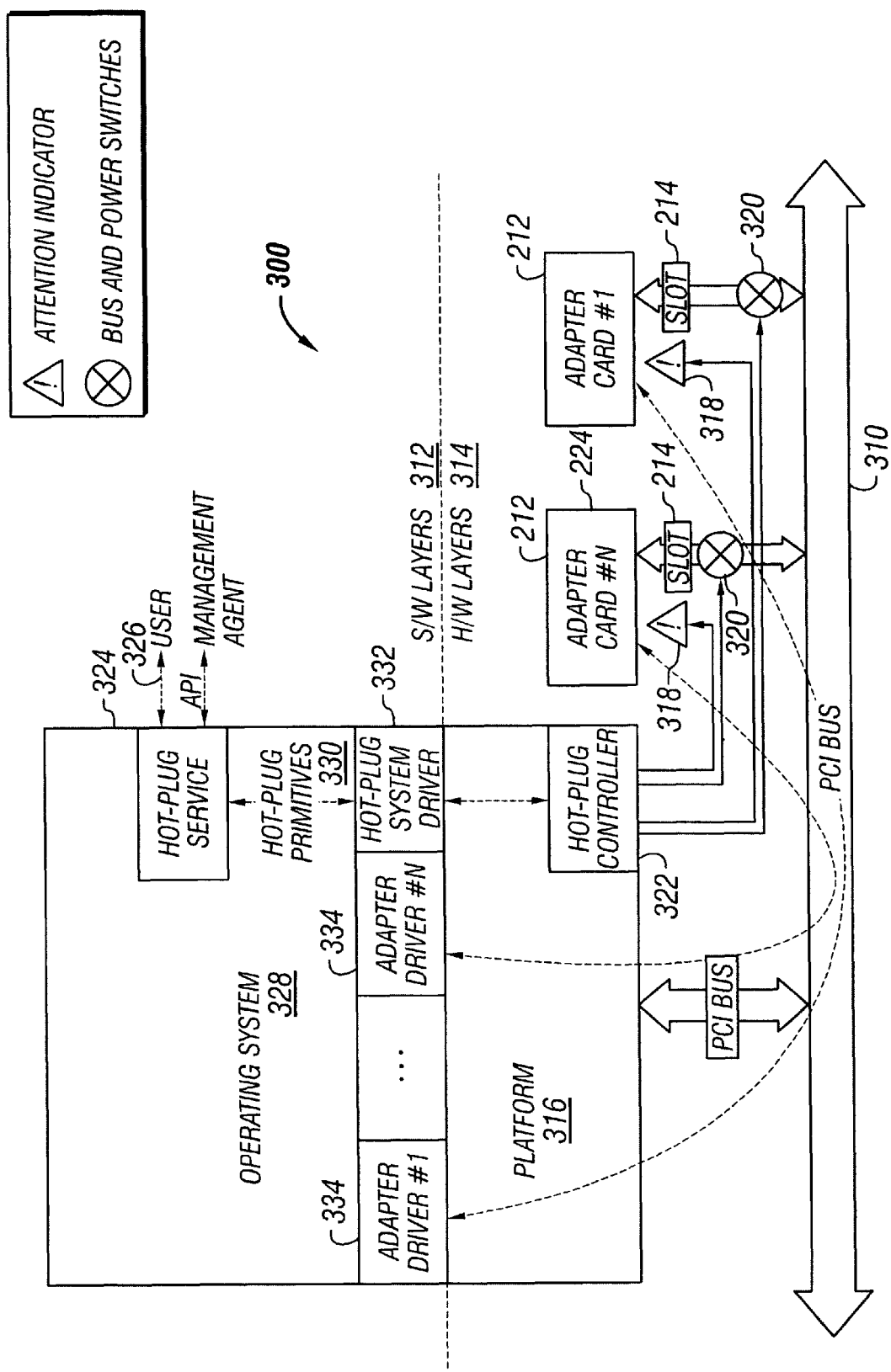
FIG. 3 is a schematic system block diagram showing hardware and software components and interconnections of a typical hot-plug system.

Referring to FIG. 3, a schematic system block diagram shows hardware and software components and interconnections of a typical hot-plug system 300. The hot-plug system 300 is generally interconnected using an interface bus 310, in the illustrative embodiment a peripheral component interconnect (PCI) bus. The hot-plug system 300 includes software layers 312 and hardware layers 314.

The hardware layers 314 include a platform 316 formed of a collection of hardware including the interface bus 310. The platform 316 generally includes a power supply, one or more processors or CPUs, a host-bus-to-interface-bus bridge, and various peripheral devices including disk drives, keyboards, displays, and the like. The hardware layers 314 also generally include a plurality of adapter card slots 214 that may contain respective and corresponding adapter cards 212. The adapter card slots 214 are locations for accepting the adapter cards 212 as a basic unit of hot-pluggability. Individual adapter card slots 214 are isolated from the remainder of the platform 316 for reliable insertion and removal of the adapter cards 212. The adapter card slots 214 are also respectively connected to and associated with attention indicators 318 and with bus and power switches 320. The attention indicators 318 are physical indicators that are located to draw attention of the user to a particular adapter card slot 214. Under the PCI specification, the platform is required to supply one attention indicator 318 per hot-plug slot. The state of the attention indicator 318 is set by the hot-plug service 324. The bus and power switches 320 are connected between the adapter card slots 214 and the interface bus 310.

The platform 316 also includes a hot-plug controller 322 that communicates control signals to the bus and power switches 320 and the attention indicators 318 for the individual adapter card slots 214. The hot-plug controller 322 is a hardware system supplied by the platform vendor that controls electrical aspects of applying and terminating power to an adapter card slot 214. A single hot-plug controller typically controls more than one adapter card slot 214. A hot-plug platform may include more than one hot-plug controller 322.

The PCI Local Bus Specification requires a present signal PRSNT[1:2]# connection associated with each adapter card slot. One or both of the PRSNT[1,2 ]# bits is to be grounded by the adapter cards to indicate that the card is present in the slot and to indicate the amount of power the adapter card utilizes. The hot-plug platform reads the pins to determine which adapter card slots are occupied and the amount of power used by the card.

The software layers 312 include a hot-plug service 324, high-level software having overall control of hot-plug operations. The hot-plug service 324 is a broad collection of software routines that monitor and control hot-plug operations including a user interface 326 and hot-plug sequence control. The hot-plug service 324 includes a user interface 326 and issues requests to an operating system 328 to quiesce adapter activity. The hot-plug service 324 also issues hot-plug primitives 330 to a hot-plug system driver 332 to activate and deactivate adapter card slots 214. Hot-plug primitives 330 define what information is passed between the hot-plug service 324 and the hot-plug system driver 332. Before an adapter card 212 in a respective adapter card slot 214 is removed or inserted, adapter activity must be quiesced. When adapter activity is quiesced, the respective adapter driver 334, does not send operations to the adapter card 212, and the adapter card 212 does not initiate interrupts or bus master activity.

The hot-plug primitives 330 are specific requests issued by the hot-plug service 324 to the hot-plug system driver 332 to determine status and to control a hot-plug slot in the platform 316. The hot-plug system driver 332 is a software driver that controls and monitors the hot-plug controller hardware.

Several forms of slot identification are used in a hot-plug system including a physical slot identifier, bus and device number, and a logical slot identifier. The hot-plug primitives 330 include several parameters. One parameter is a logical slot identifier, a parameter of the hot-plug primitives 330 that uniquely identifies a particular adapter card slot 214. Some logical slot identifiers identify the location by bus number and device number, other identifiers set the location by physical slot number. A physical slot identifier is a designation that uniquely identifies a physical adapter card slot 214, such as a slot number in a single-chassis system or a combination of chassis identifier and slot number in a multiple-chassis system.

The software layers 312 also includes a plurality of adapter drivers 334, software drivers that control respective adapter card slots 214.

A platform configuration routine (not shown) is software that initializes a bus configuration space header for a newly installed adapter card 212.

Referring to FIG. 4 in conjunction with FIG. 3, a schematic flow chart shows a general sequence of operations 400 for removing an adapter card from an adapter card slot that is currently powered in a hot-plug system using the described electrically-conductive flip-down retainer. In an initial operation 410, a user determines that an adapter card is to be removed or replaced, then unlatches the latched electrically-conductive flip-down retainer 412, allowing the adapter card to be removed from the adapter card slot. Unlatching of the electrically-conductive flip-down retainer activates (or deactivates) a switch, communicating a signal to the hot-plug controller 322.

In an operation 414, the hot-plug service 324 uses operating system functions to quiesce an appropriate adapter driver 334 and associated adapter card. Before an adapter card is removed from a platform, the operating system is to stop accessing the adapter card, and the adapter card is to stop accessing the system. The sequence of steps that the system uses to stop mutual accessing by the system and adapter card is called "quiescing" adapter activity. The sequence of operations for quiescing activity includes cessation of new request issues by the system to the adapter driver or notification of the adapter driver to stop accepting new requests, completion or termination of outstanding requests by the adapter driver, and the adapter driver placing the adapter card in an inactive state. In the inactive state, the adapter card does not initiate interrupts or bus activity. When the adapter driver is quiesced, the driver no longer issues bus transactions to the adapter card, even if another device sharing the same interrupt input terminal generates an interrupt. An adapter driver that controls multiple adapter cards must quiesce only the binding for the selected adapter card.

In an operation 416, the hot-plug service 324 issues a hot-plug primitive 330 to the hot-plug system driver 332 to terminate power to the appropriate adapter card slot. Applications or the operating system query the hot-plug system driver 332 to determine the set of logical slot identifiers for slots controlled by the driver. In operation 418, the hot-plug system driver 332 uses the hot-plug controller 322 to assert a reset RST# signal to the adapter card slot and isolate the adapter card slot from the remainder of the bus. In some systems, the RST# signal is asserted first. In other systems, the adaptor card slot is first isolated from the bus, then the RST# signal is asserted. Commands are sent to the adapter card slot to set status of the hot-plug slot, and the state of the attention indicator for the slot. The command passes parameters including a logical slot identifier, a new slot state (on or off), and a new attention indicator state (normal or attention). The slot state is either on or off. If the state of the slot is "powered down" and isolated from the bus, the adapter card can be safely removed or installed. In the "on" state, the slot is powered. Parameters returned for a command setting slot status include a request completion status indicating a successful status change, a fault due to wrong frequency, a fault due to insufficient available power, a fault due to insufficient configuration resources, a power failure fault, and a general failure fault.

In an operation 420, the hot-plug controller 322 terminates power to the adapter card slot. In operation 422, the hot-plug controller 322 modifies a slot-state indicator, which is optional in some systems, to generate a sensory notification such as a light signal to indicate that power is terminated to the adapter card slot. In operation 424, the hot-plug service 324 reports to the user that power to the adapter card slot is terminated. In operation 424, the user removes the adapter card.

Referring to FIG. 5 in conjunction with FIG. 3, a schematic flow chart shows a general sequence of operations 500 for terminating power to an adapter card slot and isolating the bus prior to insertion of an adapter card. The process of preparing an adapter card slot for insertion of an adapter card varies from platform to platform and among operating systems. In an operation 510, a user inserts an adapter card into a corresponding adapter card slot. The user in operation 512 then latches the electrically-conductive flip-own retainer, setting the retainer switch to indicate the presence of an adapter card secured to the adapter card slot. In operation 514, setting of the retainer switch notifies the hot-plug service 324 to set power to the adapter card slot into which the adapter card is inserted. The hot-plug service 324 in operation 516 issues a hot-plug primitive 330 to the hot-plug system driver 332 requesting the driver to apply power to the appropriate adapter card slot. In operation 518, the hot-plug system driver 332 uses the hot-plug controller 322 to power the adapter card slot. The hot-plug controller 322 deasserts the reset signal RST# on the adapter card slot and connects the adapter card slot to the remainder of the bus in operation 520. The operations of deasserting the RST# signal and connecting the adapter card slot to the bus may occur in any order. In operation 522, the hot-plug controller 322 modifies the slot-state indicator signal to show that the adapter card slot is powered. The adapter driver verifies that the adapter card has completed internal initialization before the driver uses the adapter card. The adapter driver may become active sooner after a hot-insertion than after power is initially applied to the system. In operation 524, the hot-plug service 324 notifies the operating system that the new adapter card is installed so that the operating system can initialize the adapter and prepare for adapter use. In operation 526, the hot-plug service 324 notifies the user that the adapter card is ready for use.

The operating system can query status of an adapter card slot by a status query request that specifies a logical slot identifier. The query response returns a slot state (on or off), an adapter card power requirement (not present, low, medium, high), and adapter card frequency capability (33MHz, 66MHz, insufficient power), and a slot frequency (33MHz, 66MHz). The request returns the state of the hot-plug slot and any adapter card that is present. The adapter card power requirement parameter returns information encoded by the adapter card on the PRSNT[1:2]# pins, independent of whether the slot is on or off.

The hot-plug system also supports asynchronous notification of slot status change using a signal that identifies a logical slot identifier of the slot having the changed status. When the hot-plug system driver 332 detects an unsolicited change in the status of a slot such as a run-time power fault in the slot or a new card installed in a previously empty slot, a signal is produced to notify the hot-plug service 324 using a hot-plug primitive 330. Asynchronous notifications are not used for standard hot-removal and hot-insertion operations since the standard operations followed defined, orderly procedures. Asynchronous notifications are used to inform the hot-plug service 324 of system state modifications outside standard operations.

Figure 6:
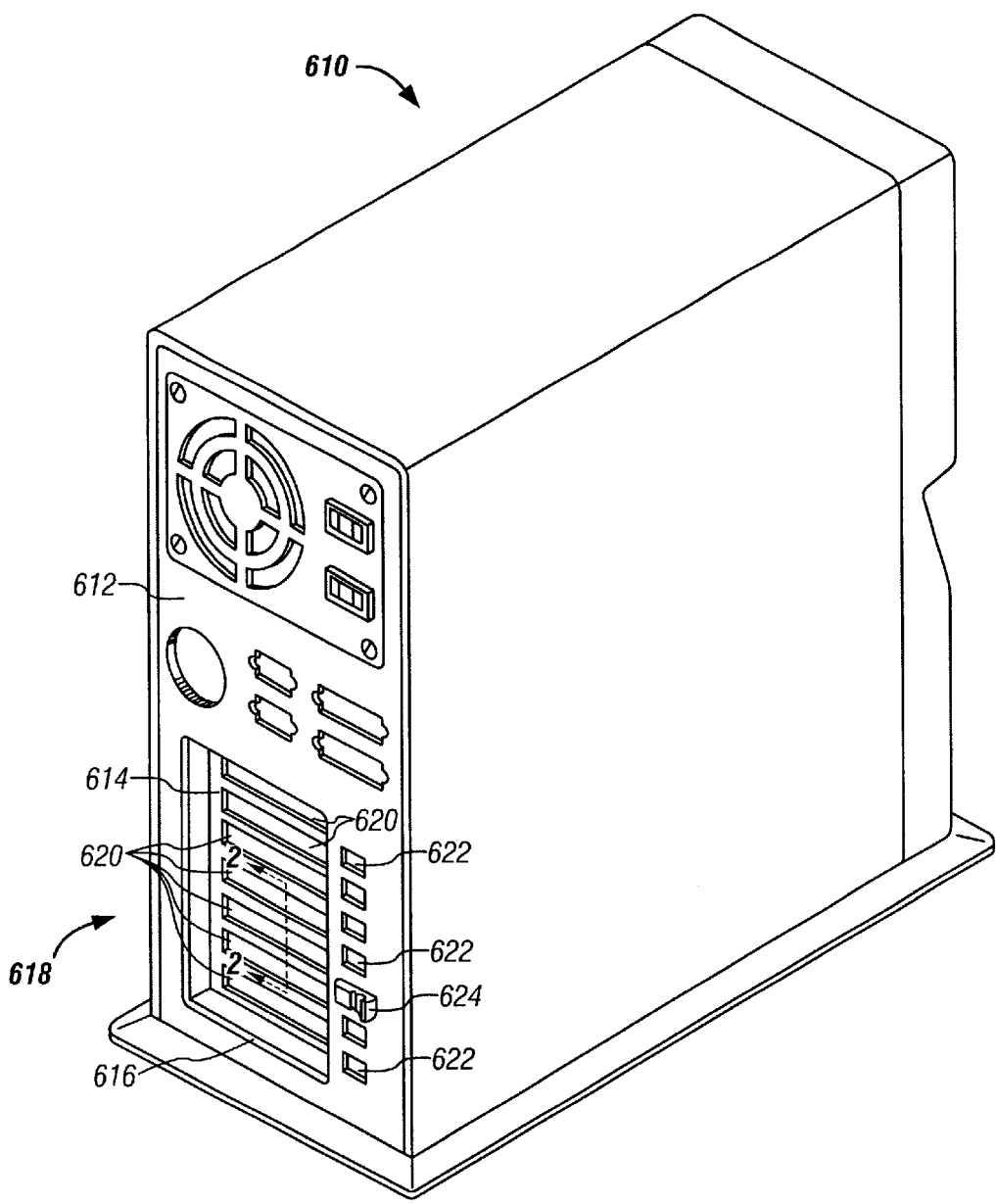
FIG. 6 is a perspective isometric rear end view showing a computer chassis and a electrically-conductive flip-down retainer that is suitable for usage in the hot-plug system.

Referring to FIG. 6, a perspective isometric view shows a computer chassis 610. The computer chassis 610 is a "tower" model simply for illustration, although any suitable configuration of computer chassis may be used. The computer chassis 610 has a wall 612 with a card cage opening 616 forming an aperture in the wall 612. A card cage 614 has a conventional design. The card cage 614 is inserted into the card cage opening 616 near a back end 618 of the computer chassis 610 for positioning within the computer chassis 610. The card cage 614 includes rectangular-shapedcard guide slots 620 which are accessible through the card cage opening 616. Retainer apertures 622 for receiving a retainer 624 are formed in the wall 612 and adjacent to the card cage 614. A plurality of retainer apertures 622 and corresponding retainers 624 are illustrated, although other configurations may include only a single retainer aperture and retainer.

Figure 7:
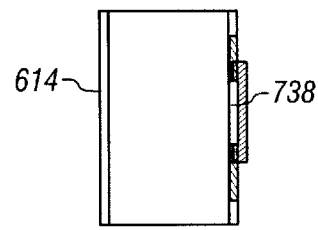
FIG. 7 is a cross sectional view taken along line 2—2 in FIG. 6 showing a card cage that is suitable for usage in the computer chassis.

Referring to FIG. 8 in combination with FIG. 7, the card cage 614 and the retainer 624 are illustrated from an interior view within the computer chassis 610. The card cage 614 has a generally rectangular frame 826 with a card guide ledge 828 formed on an end of the frame 826. The retainer 624 is shown passing through one of the retainer apertures 622 and in the engaged position to hold and retain a card guide 830, which is also called a bracket, at the card guide slot 620. The card guide 830 includes a generally rectangular, flat, elongated body member 832. The card guide 830 has a retaining tab portion 834 that is transverse to the elongated body member 832 formed on one end and an insertion tab 836 formed on the opposite end of the elongated body member 832. The illustrative card guide 830 is a "blank" card guide with no attached expansion card, a card guide with an associated expansion card may otherwise be used.

The elongated body member 832 of the card guide 830 extends across a portion of the frame 826 with the retaining tab portion 834 overlying the card guide ledge 828 and the insertion tab 836 received in an insertion tab slot 738 shown in FIG. 7 adjacent the opposite side of the card cage 614. The card guide 830 is retained and held in position by the retainer 624 that is received through the retainer aperture 622 formed in the wall 612 of the computer chassis 610.

Locking projections 840 extend inwardly from the wall 612 and adjacent the retainer aperture 622 to releasably lock the retainer 624 in the engaged position. A plurality of the retainer apertures 622 formed in the wall 612 of the computer chassis 610. The retainer apertures 622 receive a single retainer 624. The apertures 622 correspond in position to a card guide slot 620 in the card cage 614. In the illustrative example, a plurality of retainers 622 hold a plurality of card guides 830.

Figure 9:
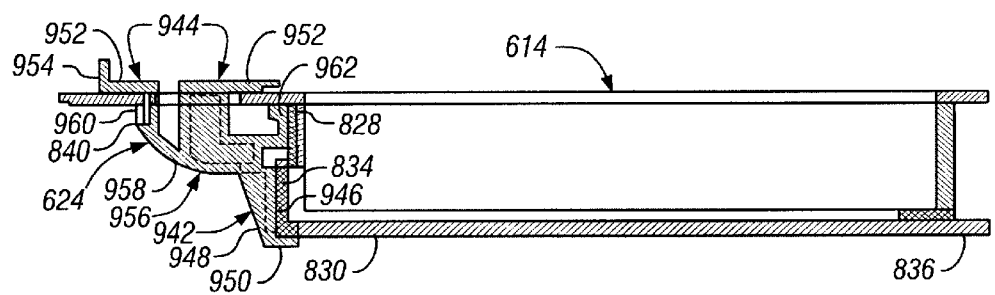
FIG. 9 is a cross sectional view showing the card cage and retainer apertures with the retainer engaged as in FIG. 8 along the line 4—4.
Figure 10:
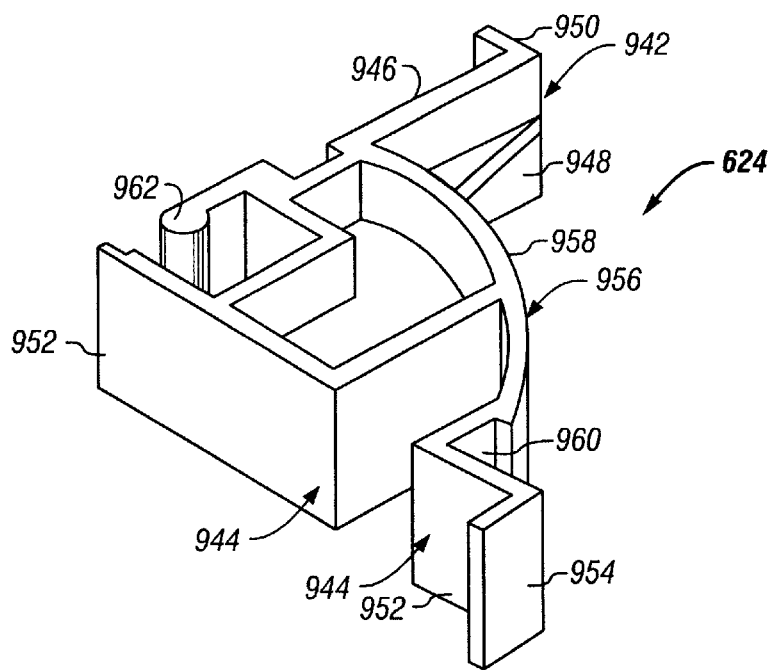
FIG. 10 is a perspective isometric view showing the retainer.

Referring to FIGS. 9 and 10, a cross-sectional view of the card cage 614 shown in FIG. 8 taken along the line 4—4 illustrates the retainer 624 in the engaged position, holding the card guide 830 about the card guide slot 620. The retainer 624 firmly retains the card guide 830 and is advantageously actuated from the exterior of the computer chassis 610. Further advantageously, since the retainers 624 hold a respective single card guide 830, card guides are inserted and removed while other card guides remain held on the card cage 614. In addition, no tool is necessary to fasten the card guide 830 to the card cage 614, resulting in a more efficient, quicker and easier way of inserting and removing a card guide 830 from the card cage 614.

The retainer 624 has a first end 942 extending through the retainer aperture 622 to the interior of the computer chassis 610. The retainer 624 has a second end 944 extending to without the retainer aperture 622 exterior to the computer chassis 610. The first end 942 includes a gripping surface 946 configured to engage and retain the card guide 830. The gripping surface 946 includes a generally rectangular planar member 948 that is extendable over the retaining tab portion 834 of the card guide 830. The gripping surface 946 further includes a securing tab 950 extending transversely from the first end 942. When the retainer 624 is in an engaged position, the securing tab 950 extends over a length of the elongated body 832 of the card guide 830 to securely hold the card guide 830 in the vicinity of the card guide slot 620.

The second end 944 has a flanged portion 952 that contacts the exterior surface of the wall 612 when the retainer 624 is in the engaged position. The flanged portion 952 includes an actuating tab 954 that extends transversely to the flanged portion 952. The actuating tab 954 extends outward from the exterior of the wall 612 and is shaped for facility in grasping from outside the computer chassis 610 to move the retainer 624 between the engaged position and disengaged position.

The retainer 624 includes an intermediate section 956 that extends between the first end 942 and the second end 944. The illustrative intermediate section 956 of the retainer 624 is an elongated body member. Alternatively, the intermediate section 956 is an arcuate intermediate section 958 that is transverse to the first end 942 and second end 944. In one example, the intermediate section 956 includes a locking notch 960 that is formed immediately adjacent the second end 944. The intermediate section 956 is configured to releasably engage the wall 612 adjacent the retainer aperture 622 and to releasably lock the retainer 624 in the engaged position.

In another example, the computer chassis 610 has the locking projections 940 extending inwardly from the wall 612 adjacent the retainer aperture 622. As the retainer 624 is moved to the engaged position, the locking projections 940 snap down into and engage a side edge of the locking notch 960, releasably securing the retainer 624 in the engaged position. The locking projections 940 are disengaged by pushing downward on the actuating tab 954 and rotating the retainer 624 outward from the wall 612 of the computer chassis 610.

In examples that do not include the locking projections 940, the locking notch 960 is shaped to releasably and securely engage the interior side of the wall 612. The width of the locking notch 960 is reduced narrower so that the edge of the locking notch 960 engages the wall 612 when the retainer 624 is in the engaged position.

In another example, the retainer 624 includes a pivoting structure 962 extending transverse to the arcuate intermediate section 958. The pivoting structure 962 engages against the interior side of the wall 612 forming a point about which the retainer 624 is pivoted from the engaged position to the disengaged position. The pivoting structure 962 is an elongated, cylindrical portion of the retainer 624 that is integrally formed with the retainer 624. In some embodiments, the retainer 624 includes a metalized plastic, a plastic, or a metal. A metalized plastic contains bits of metal or a plastic that is sputter coated with a metal. The retainer 624 is constructed of a material that reduces electromagnetic interference generated within the computer chassis 610.

Figure 11:
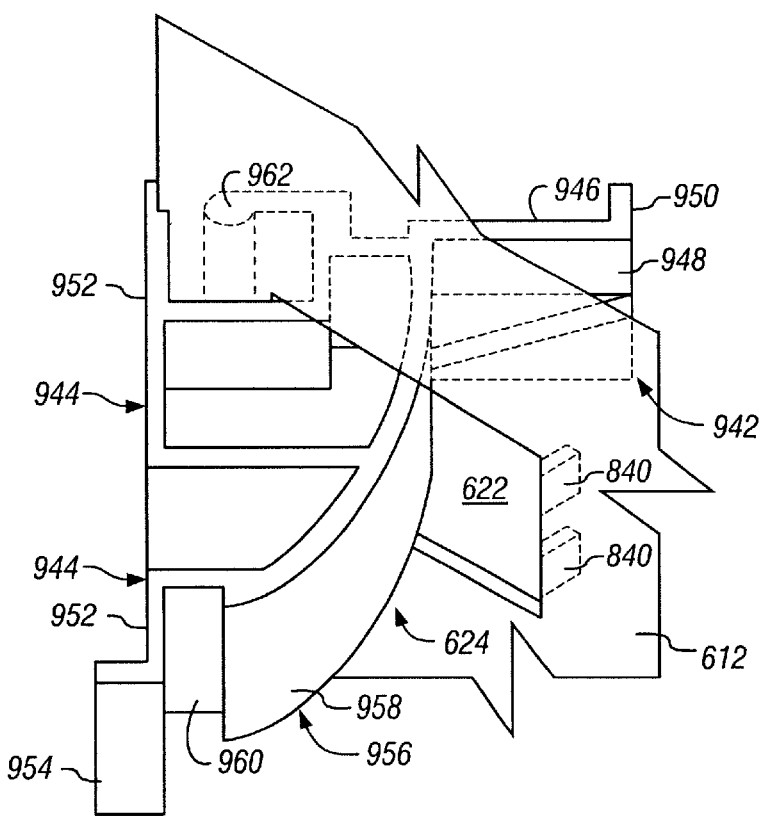
FIG. 11 is a cut-away view of the computer chassis showing one of the retainers in a pivoted disengaged position with the retainer released from the card guide.

Referring to FIG. 11, a cut-away view of the computer chassis shows one of the retainers in a pivoted disengaged position with the retainer released from the card guide. The retainer 624 is pivotable within the retainer aperture 622 and pivots about the pivoting structure 962. The arcuate intermediate section 958 and the pivoting structure 962 combine to produce a retainer 624 that is easily rotated within the retainer aperture 622.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

For example, the system is described as a PCI bus system for illustrative purposes only. The electrically-conductive flipdown retainer may be implemented in systems utilizing any suitable bus interface. Similarly, the power control functionality is described as an operating system function. In other embodiments, the control may be implemented on any suitable circuit including, for example, processors, CPUs, microcontrollers, digital signal processors, and the like. Furthermore, the control functionality need not be implemented in a processor but may be otherwise constructed in any suitable type of circuitry including programmable logic arrays, discrete logic, and the like.

Although the illustrative embodiment shows a single electrically-conductive flip-down retainer associated with a single adapter card and adapter card slot, in other embodiments one electrically-conductive flip-down retainer may be associated with a multiple-card set. A multiple-card set is any group of adapter cards that is normally installed and removed together. A multiple-card set may be interconnected with sideband cables, and may appear is a bus configuration space as multiple devices or as a single device.

What is claimed is:

1. An apparatus for fastening a card to a card slot comprising:

an electrically-conductive fastener including a first electrical contact, a second electrical contact, and a continuous conductive pathway between the first electrical contact and the second electrical contact, the first electrical contact for coupling to a first monitoring terminal and the second electrical contact for coupling to a second monitoring terminal, the electrically-conductive fastener being operative as an electrical switch forming a closed circuit between the first monitoring terminal and the second monitoring terminal when the electrically-conductive fastener is in a fastened position holding the card that is engaged in the card slot, locking the card into engagement in the card slot, and forming an open circuit otherwise.

2. An apparatus according to claim 1 wherein:

the card is an adapter card and the card slot is an adapter card slot, the adapter card including a metal bracket that fastens to a connector on a chassis, the electrically-conductive fastener being adapted to fasten the metal bracket to the connector, forming a closed electrical circuit between the metal bracket and the connector when the electrically-conductive fastener is in a fastened position holding the to the card slot and forming an open circuit otherwise.

3. An apparatus according to claim 1 wherein:

the electrically-conductive fastener is an electrically-conductive flip-down retainer in a single structure that performs the combined functions of an electrical switch and a mechanical fastener.

4. An apparatus according to claim 1 wherein:

the card is an adapter card and the card slot is an adapter card slot for coupling the adapter card to a communication bus.

5. An apparatus according to claim 1 wherein:

the card is an adapter card and the card slot is an adapter card slot for coupling the adapter card to a communication bus compliant with a peripheral component interconnect (PCI) bus specification.

6. An apparatus according to claim 1 wherein:

the card is an adapter card and the card slot is an adapter card slot for coupling the adapter card to a communication bus compliant with a hot-plug specification.

7. An apparatus according to claim 1 wherein:

the card is an adapter card and the card slot is an adapter card slot for coupling the adapter card to a communication bus in a computer system.

8. An apparatus comprising:

a communication bus;

a card slot coupled to the communication bus;

a power switch coupled to the card slot for switchably coupling a power source to the card slot; and an electrically-conductive fastener for fastening a card to the card slot, the electrically-conductive fastener including a first electrical contact, a second electrical contact, and a continuous conductive pathway between the first electrical contact and the second electrical contact, the first electrical contact for coupling to a first monitoring terminal and the second electrical contact for coupling to a second monitoring terminal, the electrically-conductive fastener being operative as an electrical switch forming a closed circuit between the first monitoring terminal and the second monitoring terminal when the electrically-conductive fastener is in a fastened position holding the card that is engaged in the card slot, locking the card into engagement in the card slot, and forming an open circuit otherwise.

9. An apparatus comprising:

a communication bus;

a card slot coupled to the communication bus;

a power switch coupled to the card slot for switchably coupling a power source to the card slot; and an electrically-conductive fastener for fastening a card to the card slot, the electrically-conductive fastener including a first electrical contact, a second electrical contact, and a continuous conductive pathway between the first electrical contact and the second electrical contact, the first electrical contact for coupling to a first monitoring terminal and the second electrical contact for coupling to a second monitoring terminal, the electrically-conductive fastener being operative as an electrical switch forming a closed circuit between the first monitoring terminal and the second monitoring terminal when the electrically-conductive fastener is in a fastened position holding the card to the card slot and forming an open circuit otherwise; and a controller coupled to the first monitoring terminal and coupled to the second monitoring terminal, the controller for monitoring the electrical switch to determine whether the switch forms a closed circuit or an open circuit.

10. An apparatus comprising:

a communication bus;

a card slot coupled to the communication bus;

a power switch coupled to the card slot for switchably coupling a power source to the card slot; and an electrically-conductive fastener for fastening a card to the card slot, the electrically-conductive fastener including a first electrical contact, a second electrical contact, and a continuous conductive pathway between the first electrical contact and the second electrical contact, the first electrical contact for coupling to a first monitoring terminal and the second electrical contact for coupling to a second monitoring terminal, the electrically conductive fastener being operative as an electrical switch forming a closed circuit between the first monitoring terminal and the second monitoring terminal when the electrically-conductive fastener is in a fastened position holding the card to the card slot and forming an open circuit otherwise; and a hot-plug controller coupled to the first monitoring terminal and coupled to the second monitoring terminal, the controller for monitoring the electrical switch to determine whether the switch forms a closed circuit or an open circuit, the hot-plug controller coupled to the power switch and controlling application of power from the power source to the card slot.

11. An apparatus according to claim 8 wherein:

the card is an adapter card and the card slot is an adapter card slot, the adapter card including a metal bracket that fastens to a connector on a chassis, the electrically-conductive fastener being adapted to fasten the metal bracket to the connector, forming a closed electrical circuit between the metal bracket and the connector when the electrically-conductive fastener is in a fastened position holding the to the card slot and forming an open circuit otherwise.

12. An apparatus according to claim 8 wherein:

the electrically-conductive fastener is an electrically-conductive flip-down retainer in a single structure that performs the combined functions of an electrical switch and a mechanical fastener.

13. An apparatus according to claim 8 wherein:

the card is an adapter card and the card slot is an adapter card slot for coupling the adapter card to the communication bus.

14. An apparatus according to claim 8 wherein:

the card is an adapter card and the card slot is an adapter card slot for coupling the adapter card to a communication bus compliant with a peripheral component interconnect (PCI) bus specification.

15. An apparatus according to claim 8 wherein:

the card is an adapter card and the card slot is an adapter card slot for coupling the adapter card to a communication bus compliant with a hot-plug specification.

16. An apparatus according to claim 8 wherein:

the card is an adapter card and the card slot is an adapter card slot for coupling the adapter card to a communication bus in a computer system.

17. A computer system comprising:

a processor;

a communication bus coupled to the processor;

a card slot coupled to the communication bus;

a power switch coupled to the card slot for switchably coupling a power source to the card slot;

a controller coupled to the power switch and controlling application of power from the power source to the card slot; and an electrically-conductive fastener for fastening a card to the card slot, the electrically-conductive fastener including a first electrical contact, a second electrical contact, and a continuous conductive pathway between the first electrical contact and the second electrical contact, the first electrical contact for coupling to a first monitoring terminal of the controller and the second electrical contact for coupling to a second monitoring terminal of the controller, the electrically-conductive fastener being operative as an electrical switch forming a closed circuit between the first monitoring terminal and the second monitoring terminal when the electrically-conductive fastener is in a fastened position holding the card that is engaged in the card slot, locking the card into engagement in the card slot, and forming an open circuit otherwise.

18. A computer system comprising:

a processor;

a communication bus coupled to the processor;

a card slot coupled to the communication bus;

a power switch coupled to the card slot for switchably coupling a power source to the card slot;

a controller coupled to the power switch and controlling application of power from the power source to the card slot;

an electrically-conductive fastener for fastening a card to the card slot, the electrically-conductive fastener including a first electrical contact, a second electrical contact, and a continuous conductive pathway between the first electrical contact and the second electrical contact, the first electrical contact for coupling to a first monitoring terminal of the controller and the second electrical contact for coupling to a second monitoring terminal of the controller, the electrically-conductive fastener being operative as an electrical switch forming a closed circuit between the first monitoring terminal and the second monitoring terminal when the electrically-conductive fastener is in a fastened position holding the card to the card slot and forming an open circuit otherwise; and a program code operable in conjunction with the processor and the controller implementing a hot-plug functionality.

19. A computer system according to claim 18 further comprising:

a hot removal process operational when the card slot is powered, a hot removal process code including:

a program code detecting unfastening of the electrically-conductive fastener of an unfastened card in a corresponding unfastened card slot; and a program code responsive to unfastening of the electrically-conductive fastener by quiescing the unfastened card and the unfastened card slot.

20. A computer system according to claim 19 further comprising:

the hot removal process code further including:

a program code issuing a hot-plug primitive to a hot-plug system driver to terminate power to the unfastened card slot;

a program code responsive to the hot-plug primitive by asserting a reset signal to the unfastened card slot, terminating power to the unfastened card slot, and controlling a slot-state indicator indicative that power to the unfastened card slot is terminated; and a program code notifying a user that power to the unfastened card slot is terminated.

21. A computer system according to claim 18 further comprising:

a hot insertion process operational when the card slot is not powered, a hot insertion process code including:

a program code detecting fastening of the electrically-conductive fastener of a newly fastened card in a corresponding fastened card slot; and a program code responsive to fastening of the electrically-conductive fastener by issuing a hot-plug primitive to a hot-plug system driver to apply power to the fastened card slot; and a program code applying power to the fastened card slot.

22. A computer system according to claim 21 further comprising:

the hot insertion process code further including:

a program code responsive to the hot-plug primitive by applying power to the card slot, deasserting a reset signal to the fastened card slot, and controlling a slot-state indicator indicative that power to the fastened card slot is applied; and a program code notifying a user that power to the fastened card slot is applied.

23. A method of operating a computer system comprising:

detecting unfastening of the electrically-conductive fastener of an unfastened card in a corresponding unfastened card slot;

responsive to unfastening of the electrically-conductive fastener, guiescing the unfastened card and the unfastened card slot; and issuing a hot-plug primitive to a hot-plug system driver to terminate power to the unfastened card slot;

responsive to the hot-plug primitive, asserting a reset signal to the unfastened card slot, terminating power to the unfastened card slot; and controlling a slot-state indicator indicative that power to the unfastened card slot is terminated.

24. A method according to claim 23 further comprising:

notifying a user that power to the unfastened card slot is terminated.

25. A method of operating a computer system comprising:

fastening a card that is engaged in a card slot with a retainer;

detecting fastening of the electrically-conductive fastener of the fastened card in a corresponding fastened card slot; and responsive to fastening of the electrically-conductive fastener, issuing a hot-plug primitive to a hot-plug system driver to apply power to the fastened card slot; and applying power to the fastened card slot.

26. A method of operating a computer system comprising:

detecting fastening of the electrically-conductive fastener of a newly fastened card in a corresponding fastened card slot; and responsive to fastening of the electrically-conductive fastener, issuing a hot-plug primitive to a hot-plug system driver to apply power to the fastened card slot;

applying power to the fastened card slot;

responsive to the hot-plug primitive, applying power to the card slot;

deasserting a reset signal to the fastened card slot;

controlling a slot-state indicator indicative that power to the fastened card slot is applied; and notifying a user that power to the fastened card slot is applied.

* * * * *